O. G. MOORE.
AUTOMOBILE SKID.
APPLICATION FILED AUG. 9, 1919.

1,388,053.
Patented Aug. 16, 1921.

Witnesses
E. R. Ruppert

Inventor
O. G. Moore
By Victor J. Evans
Attorney

UNITED STATES PATENT OFFICE.

ONON G. MOORE, OF NASHVILLE, TENNESSEE.

AUTOMOBILE-SKID.

1,388,053.  Specification of Letters Patent.  Patented Aug. 16, 1921.

Application filed August 9, 1918. Serial No. 249,204.

*To all whom it may concern:*

Be it known that I, ONON G. MOORE, a citizen of the United States, residing at Nashville, in the county of Davidson and State of Tennessee, have invented new and useful Improvements in Automobile-Skids, of which the following is a specification.

This invention relates to a skid whereby an automobile may extricate itself from a depression or soft place in a road.

The object of the invention is to produce a skid for extracting traction wheels from holes or ruts, comprising a substantially rectangular member having a shaft provided with cranked ends journaled on one of the ends of the skid, one of the cranked ends having secured thereto a chain or similar element which is designed to be passed between the spokes of the traction wheel of the machine, and the other end of the flexible element being adjustably connected to the second cranked end of the shaft, and whereby, when power is imparted to the traction wheel the skid will be turned beneath the same to permit of the wheel traveling out of the hole or rut in the rut wheel.

The drawings illustrate a simple and satisfactory embodiment of the improvement in which:—

Figure 1:
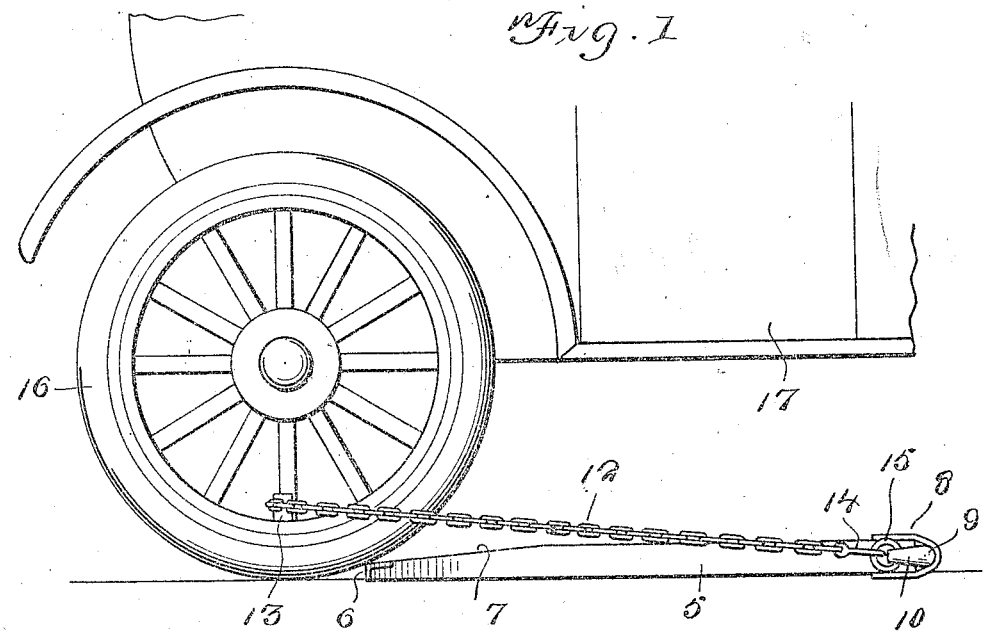
Figure 1 is a side elevation showing the manner of using the skid.
Figure 2:
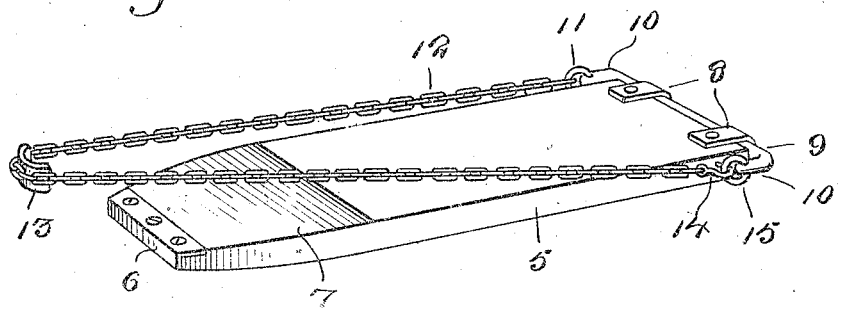
Fig. 2 is a perspective view of the skid.

The body of the improvement is in the nature of a rectangular board or plank, and is designated by the numeral 5. The body 5 on the upper face thereof is beveled, as at 7 to one of the ends of the body. For distinction this end will be referred to as the inner end, of the skid body. The inner end, at the upper corner thereof is recessed transversely, and received in the recess is the upper member of the angle plate 6. This angle plate is suitably secured to the skid body and in addition to preventing wear on the inner corner of the skid, serves as a means whereby the traction wheel can obtain a better gripping engagement with the skid in its initial passage thereover.

On the opposite side of the outer end of the body 5 there is secured a pair of spaced substantially U-shaped clips 8. The distance between these clips is sufficient to permit of the traction wheel passing therebetween without contacting therewith. The clips provide bearings for a shaft 9. This shaft has both of its ends bent angularly in the same direction, providing cranked portions 10. Both of the cranks 10 have openings therethrough, and from one of the openings passes a ring 11, while through the other opening passes a ring 15. Secured to the ring 11 is a chain 12. On the chain 12 is an adjustable cross section U-shaped saddle 13. On the free end of the chain is a hook 14. This hook may engage the ring 15 to lock the free end of the chain to the shaft 9.

As disclosed in Fig. 1 of the drawings, the opposite end of the skid is brought against the traction wheel 16 of an automobile 17, and thereafter the chain 12 is passed between two of the spokes of the wheel, permitting the saddle 13 to contact with one of the spokes. The hook 14 is then secured to the ring 15 and the motor is started. The turning of the wheel 16 will draw the skid body 5 toward the wheel partly beneath the same, permitting the said wheel to travel first over the inclined surface 7 and then on to the straight surface of the body of the skid. The strain between the wheel and chain is delivered to the opposite outer corners of the skid and the shaft will partly turn in its bearings 8 when the chain is elevated by the turning of the wheel 16. The wheel may pass entirely off of the skid and the latter may readily be detached from its connection with the wheel by simply removing the hook 14 with its engagement with the ring 15.

What I claim is:—

An automobile skid for assisting in extracting the traction wheel of the automobile from a hole or rut, comprising a substantially rectangular body which is beveled from the outer face thereof toward its inner end, an angle reinforcing plate on said inner end, a transversely arranged shaft journaled in bearings on the outer end of the skid and said shaft having its ends cranked in the same direction, rings carried by the cranked ends of the shaft, a chain secured to one of said ends, a slidable saddle on the chain to engage with the spoke of the automobile wheel to be extracted, and a hook on the free end of the chain for engaging with the ring on the second crank of the shaft.

In testimony whereof I affix my signature.

ONON G. MOORE.